US011534687B2

(12) United States Patent
Nomura et al.

(10) Patent No.: US 11,534,687 B2
(45) Date of Patent: *Dec. 27, 2022

(54) INFORMATION PROCESSING APPARATUS AND APPLICATION IMAGE DISTRIBUTION METHOD

(71) Applicant: Sony Interactive Entertainment Inc., Tokyo (JP)

(72) Inventors: Masanori Nomura, Tokyo (JP); Masahiro Fujihara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/327,367

(22) Filed: May 21, 2021

(65) Prior Publication Data

US 2021/0275913 A1 Sep. 9, 2021

Related U.S. Application Data

(63) Continuation of application No. 16/473,675, filed as application No. PCT/JP2017/047284 on Dec. 28, 2017, now Pat. No. 11,040,279.

(30) Foreign Application Priority Data

Jan. 6, 2017 (JP) .............................. JP2017-001397

(51) Int. Cl.
*A63F 13/352* (2014.01)
*A63F 13/77* (2014.01)
*A63F 13/85* (2014.01)

(52) U.S. Cl.
CPC ............ *A63F 13/352* (2014.09); *A63F 13/77* (2014.09); *A63F 13/85* (2014.09); *A63F 2300/572* (2013.01)

(58) Field of Classification Search
USPC ........................................................ 463/42
See application file for complete search history.

(56) References Cited

U.S. PATENT DOCUMENTS

2004/0163132 A1* 8/2004 Oka .................... G06F 15/8007
725/141
2006/0268378 A1* 11/2006 Yano ...................... H04N 5/202
358/521

(Continued)

FOREIGN PATENT DOCUMENTS

JP 2002344557 A 11/2002
JP 2011-072735 A 4/2011

(Continued)

OTHER PUBLICATIONS

Notice of Reasons for Refusal dated Mar. 30, 2021, from Japanese Patent Application No. 2020-122168, 3 sheets.

(Continued)

*Primary Examiner* — Pierre E Elisca
(74) *Attorney, Agent, or Firm* — Katten Muchin Rosenman LLP (57) ABSTRACT

A game image generating section 120 generates a first image and a second image of an application. An image providing section 152 provides the first image to an output apparatus 4. A sharing processing section 160 streaming-distributes the second image to the sharing server. A display image generating section 150 may generate a display image including at least the first image and information associated with the second image. In addition, the sharing processing section 160 may instruct the application to generate the second image on the basis of a request from a viewing user.

6 Claims, 8 Drawing Sheets

(56) References Cited

U.S. PATENT DOCUMENTS

| | | | | |
|---|---|---|---|---|
| 2009/0125842 A1* | 5/2009 | Nakayama | ......... | H04N 21/4312 715/835 |
| 2009/0251482 A1* | 10/2009 | Kondo | ................. | H04N 5/2624 345/589 |
| 2009/0252379 A1* | 10/2009 | Kondo | ............... | H04N 21/4316 382/163 |
| 2014/0274368 A1 | 9/2014 | Cotter | | |

FOREIGN PATENT DOCUMENTS

| | | |
|---|---|---|
| JP | 2013-26945 A | 2/2013 |
| JP | 2013-229883 A | 11/2013 |
| JP | 2014-188296 A | 10/2014 |
| JP | 2015-077291 A | 4/2015 |
| JP | 2015-097803 A | 5/2015 |
| JP | 2016-163131 A | 9/2016 |
| WO | 2014068806 | 5/2014 |
| WO | 2014068806 A1 | 5/2014 |

OTHER PUBLICATIONS

Notification of Reasons for Refusal dated Jan. 28, 2020, from Japanese Patent Application No. 2017-001397, 3 sheets.
United States Office Action dated Oct. 20, 2020, from corresponding U.S. Appl. No. 16/473,675.
United States Notice of Allowance dated Feb. 24, 2021, from corresponding U.S. Appl. No. 16/473,675.
International Preliminary Report on Patentability dated Jul. 18, 2019, from International Application No. PCT/JP2017/047284, 11 sheets.
International Search Report and Written Opinion dated Mar. 6, 2018, from International Application No. PCT/JP2017/047284, 6 sheets.

* cited by examiner

INFORMATION PROCESSING APPARATUS AND APPLICATION IMAGE DISTRIBUTION METHOD

TECHNICAL FIELD

The present invention relates to a technology for distributing an application image.

BACKGROUND ART

In recent years, a service for broadcast-distributing a game image when a user is playing to a plurality of viewing users through a sharing site has been popular. PTL 1 discloses sharing processing for broadcast-distributing a live distributing image including a game image being played to the viewing user. The live distributing image disclosed in PTL 1 includes a display region of an image photographed by the playing user, a comment display region in which comments from the viewing users are successively displayed, and the like. PTL 1 discloses that the viewing user generates a command to a game through comment input, and the command is reflected on the processing of the game.

CITATION LIST

Patent Literature

[PTL 1]
WO 2014/068806

SUMMARY

Technical Problems

In the sharing processing disclosed in PTL 1, the same screen as the screen which the play user sees is broadcast-distributed to the viewing user. For this reason, when, for example, a text chat region with a friend is displayed in a screen which the play user sees, since the text chat region is also encoded together with the game image to be distributed, a matter which is not preferable from a viewpoint of privacy may be caused in some cases. In addition, the viewing user may desire to see a screen different from the screen which the play user sees in some cases. It should be noted that the sharing processing of the image through the sharing site is also implemented in the application other than the game.

In the light of the foregoing, it is desirable for the present invention to provide a technology which enables an application image different from an application image displayed for a play user to be broadcast-distributed.

Solution to Problems

In order to solve the problems described above, an information processing apparatus according to a certain aspect of the present invention includes an application image generating section generating a first image and a second image of an application, an image providing section providing the first image to an output apparatus, and a sharing processing section distributing the second image.

Another aspect of the present invention is an application image distribution method. This application image distribution method includes a step of generating a first image and a second image of an application, a step of providing the first image to an output apparatus, and a step of distributing the second image.

It is to be noted that also arbitrary combinations of the constituent elements described above and the representations of the present invention obtained by conversion thereof between a method, an apparatus, a system, a recording medium, a computer program and so forth are effective as modes of the present invention.

DESCRIPTION OF EMBODIMENT

Figure 1:
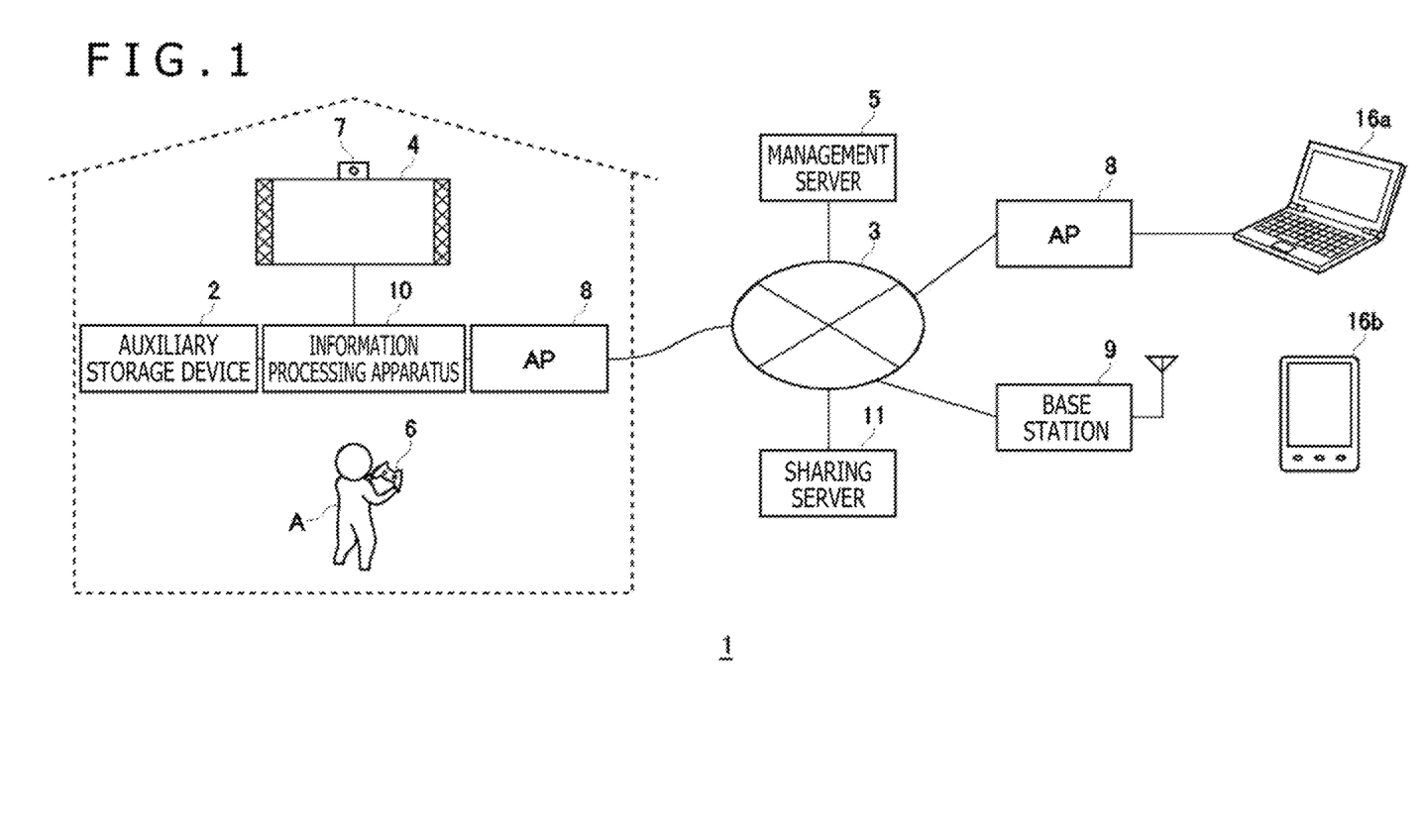
FIG. 1 is a view depicting an information processing system according to an embodiment of the present invention.

FIG. 1 depicts an information processing system 1 according to an embodiment of the present invention. The information processing system 1 realizes an environment in which a user A as a distributor live-distributes a game image being played, and another viewing user views the game image. The information processing system 1 includes an information processing apparatus 10 which the distribution user utilizes, a management server 5, a sharing server 11, and various kinds of terminal apparatuses 16a and 16b which the viewing user utilizes. These constituent elements are connected to one another through a network 3 such as the Internet, a LAN (Local Area Network), or a telephone network. The access point (hereinafter, referred to as an "AP") 8 has functions of a wireless access point and a router. The information processing apparatus 10 is connected to the AP 8 in a wireless or wired manner, and communicably connected to the management server 5 and the sharing server 11 on the network 3.

The input apparatus 6 which the user manipulates is connected to the information processing apparatus 10 in a wireless or wired manner and outputs manipulation information by the user to the information processing apparatus 10. When the information processing apparatus 10 receives the manipulation information from the input apparatus 6, the information processing apparatus 10 reflects the manipulation information on processing of system software or application software, and causes the processing result to be outputted from the output apparatus 4. In the embodiment, the application software may be game software, the information processing apparatus 10 may be a game apparatus which executes the game software, and the input apparatus 6 may be equipment, such as a game controller, which supplies the manipulation information by the user. The input apparatus 6 as a game controller includes a plurality of input sections such as a plurality of push type manipulation buttons, an analog stick which can receives as input thereof an analog quantity, and a pivot type button. As will be described below, the input apparatus 6 has at least a push type manipulation button called a "SHARE button" for starting the sharing processing.

An auxiliary storage device 2 may be a large-capacity storage device such as an HDD (Hard Disc Drive) or a flash memory, and may be an external image device which is connected to the information processing apparatus 10 through a USB (Universal Serial Bus) or the like, or may also be built-in storage device. The output apparatus 4 may be a television set having a display which outputs an image, and a speaker which outputs a sound. The output apparatus 4 may be connected to the information processing apparatus 10 through a wired cable or may be connected to the information processing apparatus 10 through a wireless manner.

The access point (hereinafter, referred to as the "AP") 8 has functions of a wireless access point and a router, and the information processing apparatus 10 is connected to the AP 8 in a wireless or wired manner to be connected to an external network. A camera 7 is a stereo camera and photographs a space of the circumference of the output apparatus 4. Although FIG. 1 depicts an example in which the camera 7 is mounted to an upper section of the output apparatus 4, the camera 7 may also be arranged on a side of the output apparatus 4 instead. In any case, the camera 7 is arranged in a position where the camera 7 can photograph the user A who plays the game in front of the output apparatus 4.

The information processing apparatus 10 streaming-distributes the game image being played to the sharing server 11 to perform broadcast-distribution of the game image to the terminal apparatus 16a and 16b accessing the sharing server 11. In such a manner, the information processing system 1 in the embodiment operates as a game image distributing system.

The management server 5 provides a network service of a game to the user of the information processing apparatus 10. The management server 5 manages a network account which identifies the user, and the user signs in the network service provided by the management server 5 by using the network account. The user signs in the network service from the information processing apparatus 10, whereby save data of a game, and virtual prizes (trophy) which the user gets in playing the game can be registered in the management server 5, and the user can streaming-distribute the game image to the sharing server 11.

In the embodiment, a user A plays a game by manipulating the input apparatus 6, and the image of the game being played (hereinafter, referred to as a "play image" as well) is displayed on the output apparatus 4. On the other hand, the game image different from the play image is distributed from the information processing apparatus 10 to the terminal apparatus 16a or 16b of the viewing user to be displayed thereon. In FIG. 1, the terminal apparatus 16a is a personal computer and is connected to the network 3 through the AP 8. In addition, the terminal apparatus 16b is a mobile apparatus such as a smartphone and is connected to the network 3 through a base station 4. Although FIG. 1 depicts such a situation, the viewing user may receive the delivery of the game image by the same terminal apparatus as the information processing apparatus 10. It should be noted that in another example, the information processing apparatus 10 and the terminal apparatus may be connected to each other in the form of P2P, such that the information processing apparatus 10 and the terminal apparatus can mutually transmit/receive the data. Hereinafter, in the case where not particularly distinguished from each other, the terminal of the viewing user is generally referred to as a "terminal apparatus 16."

Figure 2:
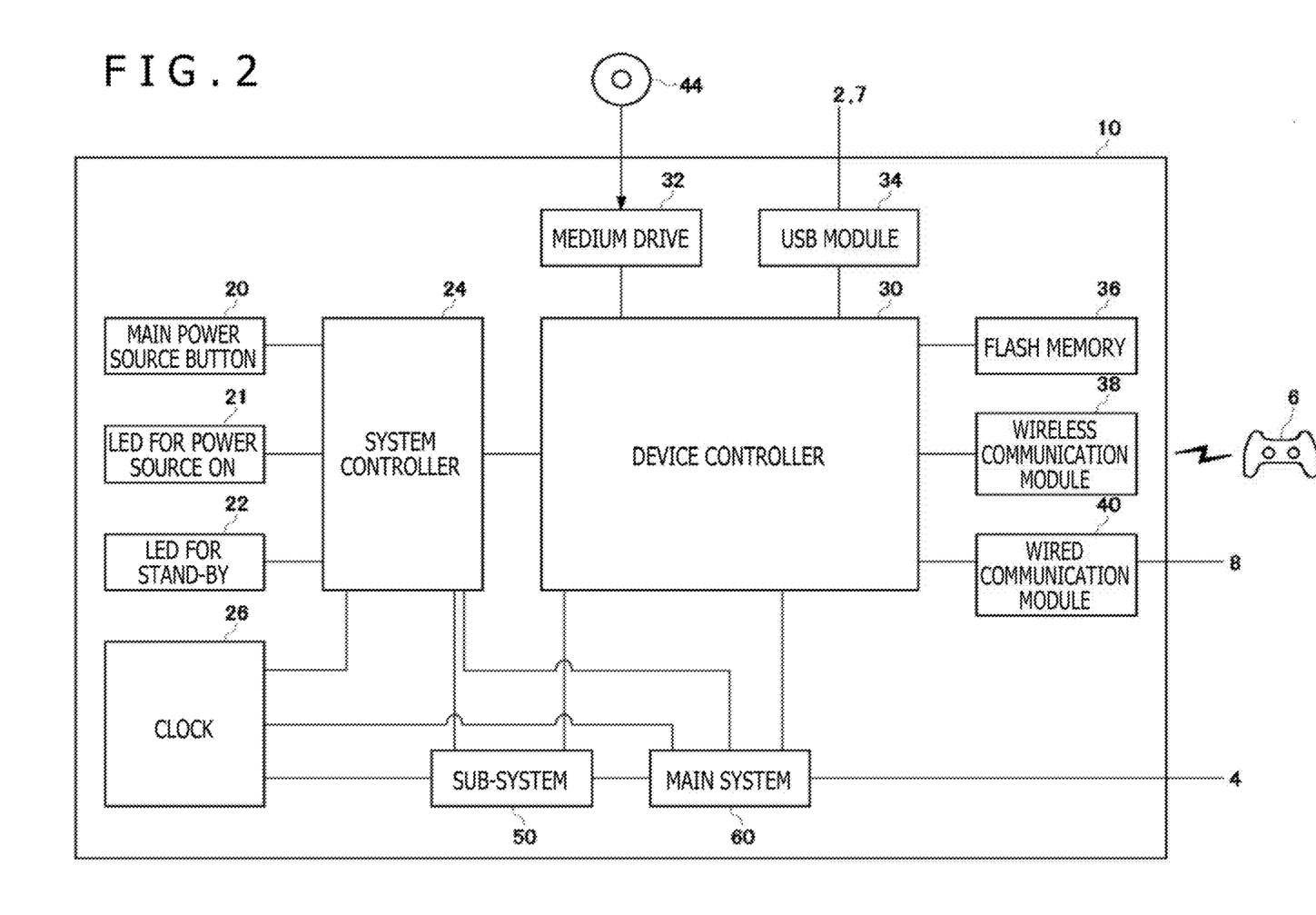
FIG. 2 is a block diagram depicting a functional block of an information processing apparatus.

FIG. 2 depicts a functional block diagram of the information processing apparatus 10. The information processing apparatus 10 includes a main power source button 20, an LED (Light Emitting Diode) 21 for power source ON, an LED 22 for stand-by, a system controller 24, a clock 26, a device controller 30, a medium drive 32, a USB module 34, a flash memory 36, a wireless communication module 38, a wired communication module 40, a sub-system 50, and a main system 60.

The main system 60 includes a main CPU (Central Processing Unit), a memory and a memory controller as a main storage device, a GPU (Graphics Processing Unit), and the like. The GPU is mainly utilized in arithmetic operation processing of a game program. These functions may be configured in the form of a system-on-chip and may be formed on one chip. The main CPU has a function of executing a game program recorded in an auxiliary storage device 2 or in a ROM (Read-Only Memory) medium 44.

The sub-system 50 includes a sub-CPU, a memory as a main storage device, and a memory controller, and the like and does not include the GPU and does not have a function of executing a game program. The number of circuit gates of the sub-CPU is smaller than the number of circuit gates of the main CPU, and the operation power consumption of the sub-CPU is less than the operation power consumption of the main CPU. The sub-CPU operates even while the main CPU is in a stand-by state, and is limited in the processing function thereof in order to suppress the power consumption to a low level.

The main power source button 20 is an input section with which manipulation input from the user is performed, and is provided in a front surface of a chassis of the information processing apparatus 10. The main power source button 20 is manipulated in order to turn ON or OFF the power source supply to the main system 60. The LED 21 for power source ON is lighted when the main power source button 20 is turned ON, and the LED 22 for stand-by is lighted when the main power source button 20 is turned OFF.

The system controller 24 detects the depressing of the main power source button 20 by the user. When the main power source button 20 is depressed while the main power source is held in the OFF state, the system controller 24 acquires the manipulation for depressing the main power source button 20 as an "ON instruction." On the other hand, when the main power source button 20 is depressed while the main power source is held in the ON state, the system controller 24 acquires the manipulation for depressing the main power source button 20 as an "OFF instruction."

The clock 26 is a real-time clock and generates date and time information at present, and supplies the generated information to the system controller 24 or the sub-system 50 and the main system 60. The device controller 30 is configured as the LSI (Large-Scale Integrated Circuit) which performs delivery of the information between the devices like a south bridge. As depicted in the figure, devices such as a system controller 34, a medium drive 32, a USB module 34, a flash memory 36, a wireless communication module 38, a wired communication module 40, a sub-system 50, and a main system 60 are connected to the device controller 30. The device controller 30 absorbs a difference in electric characteristic among the devices or a difference in data transfer speed and controls a timing of data transfer.

The medium drive 32 is a drive apparatus which is mounted with the ROM medium 44 in which application software such as a game, and license information are recorded, and drives the ROM medium 44 to read out a program, data, or the like from the ROM medium 44. The ROM medium 44 may be a read-only recording medium such as an optical disc, a magneto-optical disc, or a Blu-ray disc.

The USB module 34 is a module which is connected to external equipment through a USB cable. The USB module 34 may be connected to the auxiliary storage device 2 and the camera 7 through the USB cable. The flash memory 36 is an auxiliary storage device configuring an internal storage. The wireless communication module 38 is a communication protocol such as a Bluetooth (registered trademark) protocol or an IEEE802.11 protocol and, for example, communicates with the input apparatus 6 in a wireless manner. The wired communication module 40 communicates with external equipment in a wired manner, and is connected to the network 3 through the AP 8. The information processing apparatus 10 in the embodiment has a function of distributing an image different from the play image which the play user sees to the sharing server 11.

Figure 3:
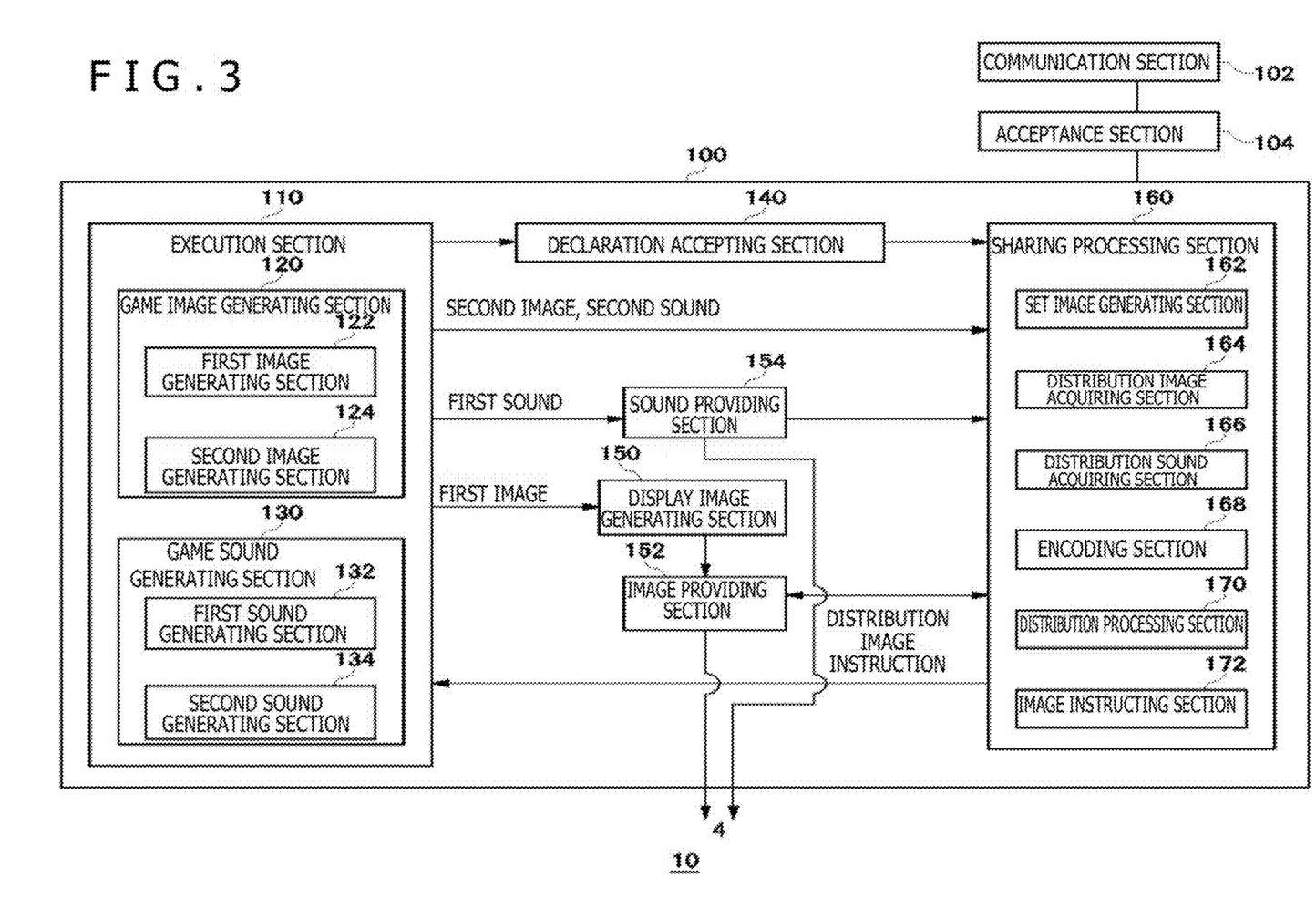
FIG. 3 is a block diagram depicting a configuration of the information processing apparatus.

FIG. 3 depicts a configuration of the information processing apparatus 10 which operates as an apparatus for distributing the streaming data. The information processing apparatus 10 includes a processing section 100, a communication section 102, and an acceptance section 104. The processing section 100 includes an execution section 110, a declaration accepting section 140, a display image generating section 150, an image providing section 152, a sound providing section 154, and a sharing processing section 160.

In FIG. 3, the constituent elements described as the functional blocks for executing various pieces of processing can be configured by a circuit block, a memory, and other LSIs in terms of hardware, and are realized by system software, a game program loaded into a memory, and the like in terms of software. Therefore, it is understood by a person skilled in the art that these functional blocks can be realized in various forms by only hardware, only software, or a combination thereof, and are by no means limited to any of them.

The execution section 110 has a function of executing game software (hereinafter, simply referred to as a "game" in some cases) to generate image data and sound data of the game. As described above, the function exhibited as the execution section 110 is realized by the system software, the game software, the hardware such as the GPU, and the like. It should be noted that in the embodiment, the game is an example of an application, and thus, the execution section 110 may execute an application other than the game. The execution section 110 has a game image generating section 120 which generates the image data of the game, and a game sound generating section 130 which generates sound data of the game.

In playing the game by the user A, the execution section 110 executes arithmetic operation processing for moving a game character in a virtual space on the basis of the manipulation information which is inputted to the input apparatus 6 by the user A. The game image generating section 120 includes a GPU (Graphics Processing Unit) which executes rendering processing or the like, and generates the game image data from a point-of-view position (virtual camera) within the virtual space in response to a result of the arithmetic operation processing in the virtual space. In addition, the game sound generating section 130 generates the game sound data in the point-of-view position in the virtual space.

The game in the embodiment has a function of generating the image data and the sound data which are to be streaming-distributed separately from the image data and the sound data which are to be outputted to the output apparatus 4. Hereinafter, the image data and the sound data are together referred to as the "image and sound data" in some cases. Although in the embodiment, a description is given with respect to the processing in the case where the game having the function of generating the image and sound data for distribution is executed, the execution section 110 can also execute the game which does not have the function of generating the image and sound data for distribution. For this reason, the sharing processing section 160 taking charge of the distribution processing needs to confirm whether or not the image and sound data for distribution is generated by the game being executed.

Then, the game having the function of generating the image and sound data for distribution has a function of, as soon as being activated by the execution section 110, making a declaration about the distribution, specifically, making a declaration to the effect that the image different from the image outputted to the output apparatus 4 is distributed.

The declaration accepting section 140 accepts the declaration about the distribution from the game. At this time, the game also makes a declaration of resolution of the image for distribution capable of being generated. For example, in the case where four kinds of drawing resolutions such as 360p (640×360), 540p (960×540), 720p (1280×720), and 1080p (1920×1080) are prepared as the drawing resolutions of the information processing apparatus 10, the game makes the declaration as to in which resolution the image for distribution can be generated. The sharing processing section 160 executes the processing for distributing the image different from the image which is to be outputted to the output apparatus 4 on the basis of the declaration which the declaration accepting section 140 has accepted.

It should be noted that the game not having the function of generating the image and sound data for distribution may not have the function of making the declaration about the distribution. In this case, the declaration accepting section 140 shall accept the declaration about the distribution from only the game having the function of generating the image and sound data for distribution. If the declaration accepting section 140 does not accept the declaration from the activated game, then, the sharing processing section 160 executes the processing for distributing the image which is to be outputted to the output apparatus 4. It should be noted that the game not having the function of generating the image and sound data for distribution may have the function of making the declaration about the distribution, specifically, the function of making the declaration to the effect that the same image as the image which is to be outputted to the output apparatus 4 is distributed. In this case, the sharing processing section 160 shall execute the processing for distributing the output image to the output apparatus 4, or distributing the image different from the output image in response to contents of the declaration which the declaration accepting section 140 has accepted.

The game image generating section 120 has a first image generating section 122 which generates a first image (play image) which is to be outputted from the output apparatus 4, and a second image generating section 124 which generates a second image (distribution image) which is to be streaming-distributed to the sharing server 11. The first image and the second image are generated in such a way that at least one of a position, a line-of-sight direction, or an angle of view of a virtual camera in a game virtual space is made different between the first image and the second image. The game sound generating section 130 has a first sound generating section 132 which generates a first sound (play sound) which is to be outputted from the output apparatus 4, and a second sound generating section 134 which generates a second sound (distribution sound) which is to be streaming-distributed to the sharing server 11. Although the first sound and the second sound may be sounds different from each other if the positions or the line-of-sight directions of the virtual cameras which photograph the first image and the second image are different between the first sound and the second sound, the first sound and the second sound may be the same sound. It should be noted that in the case where the sound of the distribution image is made usually identical to the sound of the play image, the function of the second sound generating section 134 is unnecessary.

As described above, the second image generating section 124 and the second sound generating section 134 are realized by the game having the function of generating the image and sound data for distribution, and is not realized by the game not having the function of generating the image and sound data for distribution. Therefore, in the embodiment, the game not having the function of generating the image and sound data for distribution, as in the past, shall have only the functions of the first image generating section 122 and the first sound generating section 132.

In the information processing apparatus 10, the communication section 102 receives the manipulation information obtained by manipulating the input section of the input apparatus 6 by the user, and transmits the image and sound data for distribution generated by the processing section 100 to the sharing server 11. The communication section 102 is expressed as the configuration having the functions of both of the wireless communication module 38 and the wired communication module 40 depicted in FIG. 2.

The acceptance section 104 is provided between the communication section 102 and the processing section 100, and transmits the data or the information between the communication section 102 and the processing section 100. When the acceptance section 104 accepts the manipulation information of the input section provided in the input apparatus 6 through the communication section 102, the acceptance section 104 supplies the manipulation information to the execution section 110 and/or the sharing processing section 160 in the processing section 100.

Figure 4:
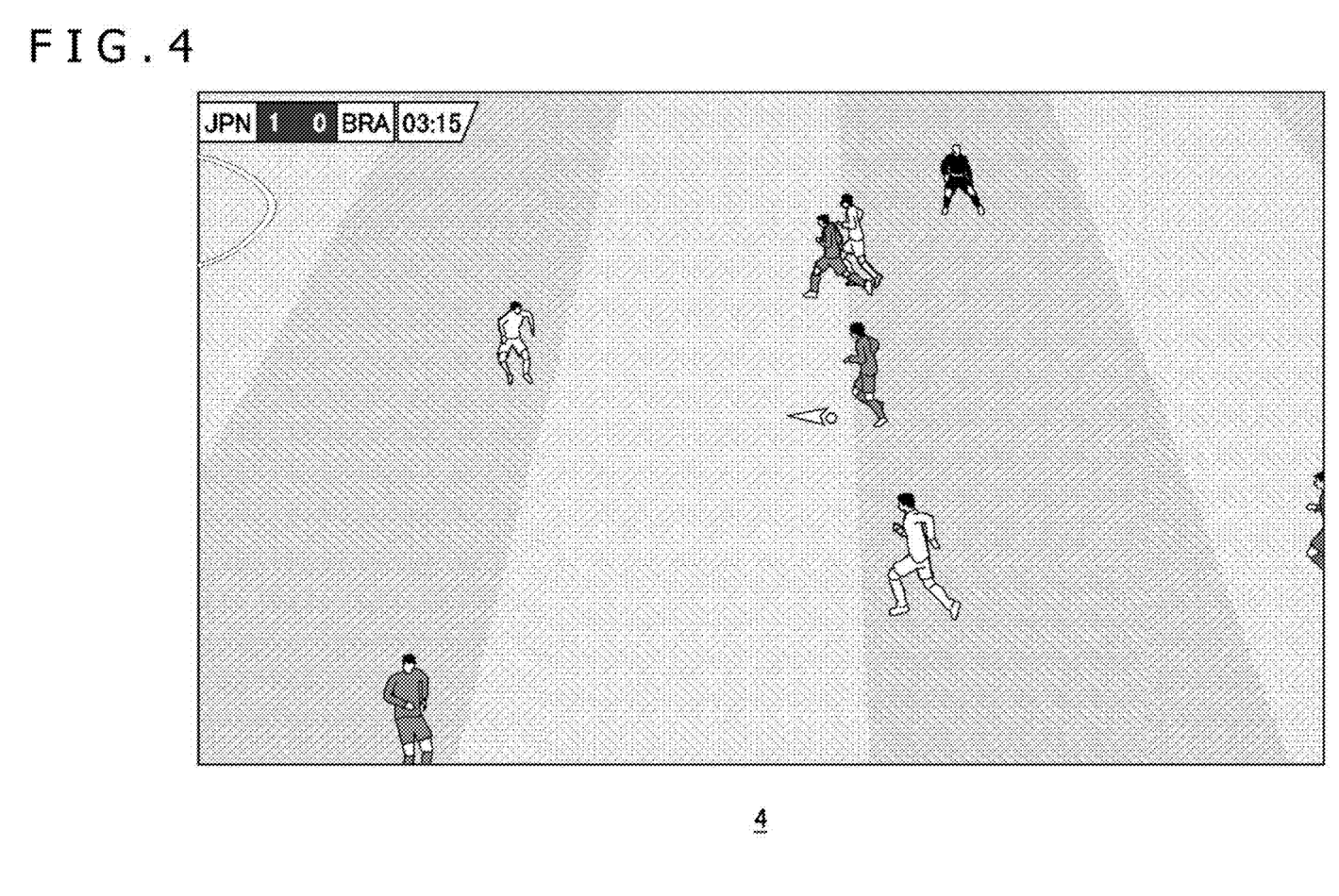
FIG. 4 is a view depicting an example of a game screen displayed on an output apparatus.

FIG. 4 depicts an example of a game screen which is displayed on the output apparatus 4. While the user A is playing the game, the first image generating section 122 generates the first image (play image) which is to be outputted to the output apparatus 4, and the image providing section 152 provides the first image to the output apparatus 4. Likewise, the first sound generating section 132 generates a first sound (play sound) which is to be outputted to the output apparatus 4, and the sound providing section 154 provides the first sound to the output apparatus 4. As a result, the output apparatus 4 outputs the play image and the play sound, and the user A plays the game. It should be noted that although in FIG. 3, the first image outputted from the execution section 110 is inputted to the image providing section 152 via the display image generating section 150, the display image generating section 150 may add a message (email notification from a friend or the like) to the first image.

The sharing processing section 160 in the embodiment executes the processing for sharing the image and sound data which the user is playing with another user. The sharing processing is executed with the manipulation of a specific input section (SHARE button) provided in the input apparatus 6 by the user A as a turning point.

During the playing of the game, when the acceptance section 104 accepts the information associated with the manipulation of the SHARE button from the input apparatus 6 of the user A, the sharing processing section 160 starts to execute the sharing processing for streaming-distributing the game image and sound data to the sharing server 11. In the beginning, the sharing processing section 160 generates an input image indicating choices about sharing of the image and sound data.

Figure 5:
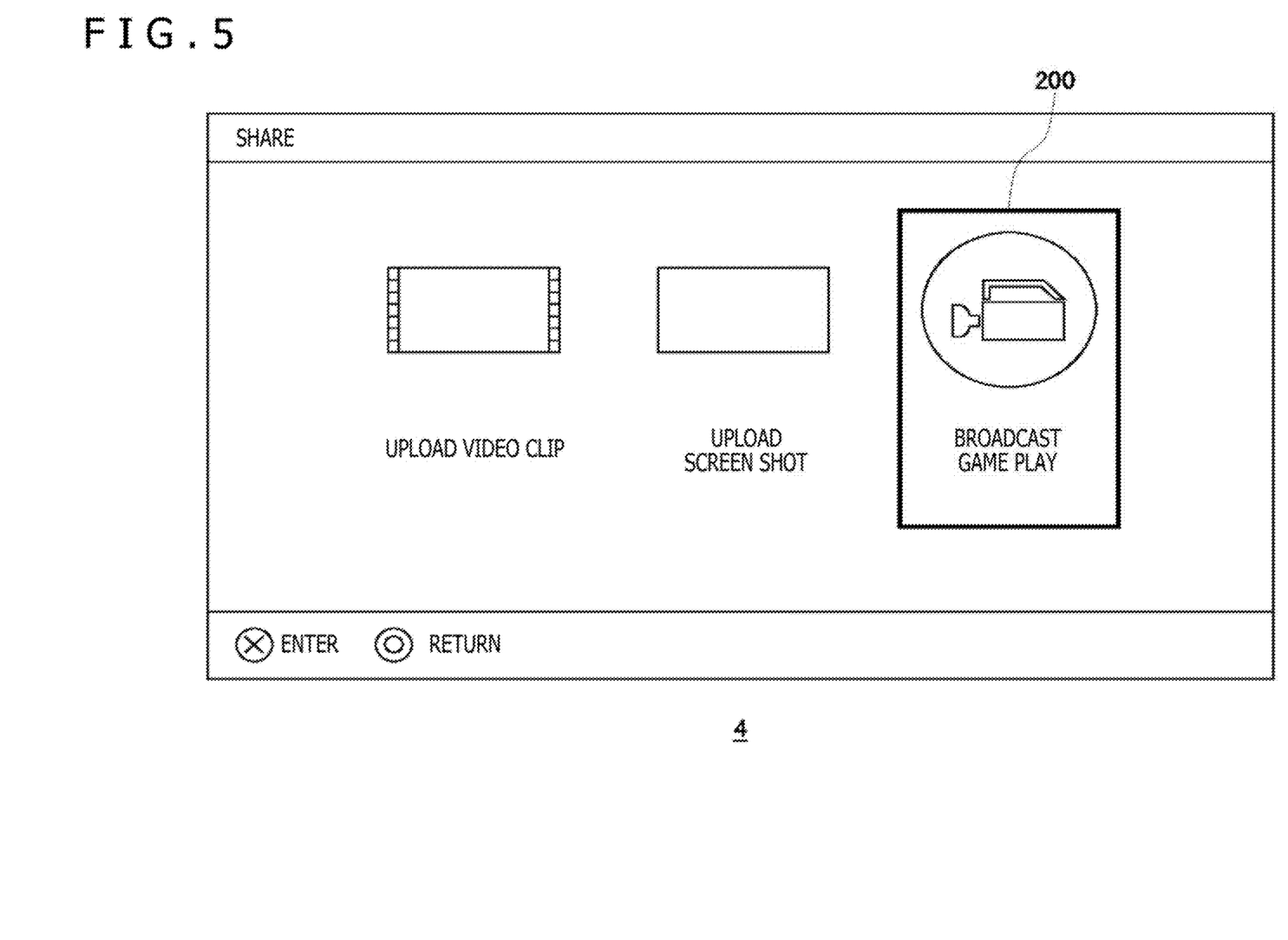
FIG. 5 is a view depicting an example of an input screen depicting choices of sharing processing.

FIG. 5 depicts an example of the input screen indicating the choices of the sharing processing. The set image generating section 162 generates the input image indicating the choices, and causes the output apparatus 4 to display the input image from the image providing section 152. In the input screen, three choices about the sharing of the image and sound data are indicated. "Upload video clip" is a GUI (Graphical User Interface) for specifying that the image recorded in the auxiliary storage device 2 is uploaded into the sharing server 11. "Upload screen shot" is a GUI for specifying that the image of a screen shot is uploaded into the sharing server 11. In addition, "broadcast game play" is a GUI for specifying that the image and sound data on the game is live-relayed through the sharing server 11. The user A moves a frame 200 by manipulating the input apparatus 6, and selects any of the GUIs to depress an enter button, so that the selected sharing processing is executed.

Figure 6:
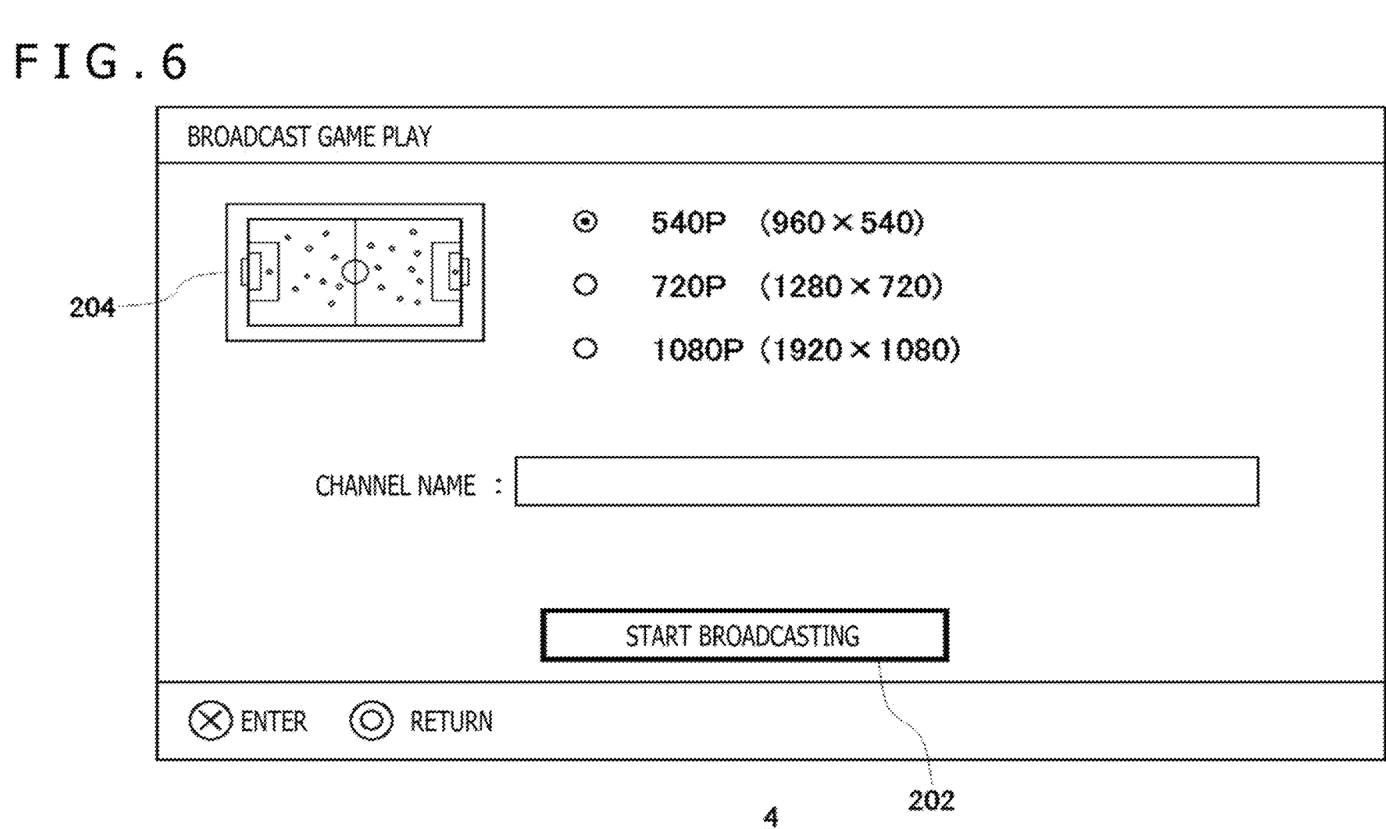
FIG. 6 is a view depicting an example of a set screen.

FIG. 6 depicts an example of the set screen which is displayed in the case where the GUI of "broadcast game play" is selected. The set image generating section 162 generates a set image causing the resolution of the game image in the broadcast distribution to be selected, and causes the output apparatus 4 to display the set image from the image providing section 152.

As described above, the declaration accepting section 140 accepts the declaration of the resolution of the distribution image which the game can generate right after the activation of the game. Here, it is supposed that the declaration accepting section 140 accepts a matter that the resolutions of 540p, 720p, and 1080p can be responded. In the case where 360p, 540p, 720p, and 1080p are prepared as the drawing resolutions of the information processing apparatus 10, the set image generating section 162 decides that the resolutions which can be distributed are 540p, 720p, and 1080p (in a word, it may be impossible to perform the distribution in the resolution of 360p), and causes 540p, 720p, and 1080p to be included as the choices in the set screen. The user A selects the resolution for the distribution image. In this example, there is depicted a situation in which the resolution of 540p is selected.

It should be noted that a screen shot of the distribution image is displayed in a screen shot display region 204. This screen shot is generated by the second image generating section 124. In this case, the second image generating section 124 generates an image in which a virtual space of a soccer game which the user A is playing is looked down from an upper side of a soccer field. It should be noted that what kind of image the second image generating section 124 generates depends on the game, and the game may change the camera position and camera line-of-sight direction in the visual space in response to a situation. When in the set screen depicted in FIG. 6, the user disposes the frame 202 in "start broadcasting" and depresses the enter button of the input apparatus 6, the distribution resolution is decided, and the acceptance section 104 notifies the sharing processing section 160 of the start of the broadcasting.

When the broadcasting is started, the sharing processing section 160 notifies the game of the distribution resolution. It should be noted that the game may monitor whether or not the broadcast distribution is being performed by using a predetermined API, and in the case where the broadcast distribution is started, may inquire the sharing processing section 160 about the distribution resolution, and in response to the inquiry, the sharing processing section 160 may notify the game of the distribution resolution. When the game is notified of the distribution resolution, the second image generating section 124 generates a distribution image in the notified resolution different from the play image. As described above, the second image generating section 124 may generate a game image photographed by the virtual camera disposed downward on the upper side of the soccer field in the virtual space. In addition, for example, the second image generating section 124 may generate a game image from an eye line of a character different from a character manipulated by the user A.

The second image generating section 124 and the second sound generating section 134 generate a second image for distribution, and a second sound for distribution to be supplied sound to the sharing processing section 160. The distribution image acquiring section 164 acquires the second image generated in the second image generating section 124, and the distribution sound acquiring section 166 acquires the second sound generated in the second sound generating section 134. The encoding section 168 encodes the second image and the second sound, and the distribution processing section 170 distributes the image and sound data obtained through the encoding to the sharing server 11. As a result, the viewing user can view the game image and sound different from the play image and sound.

Figure 7:
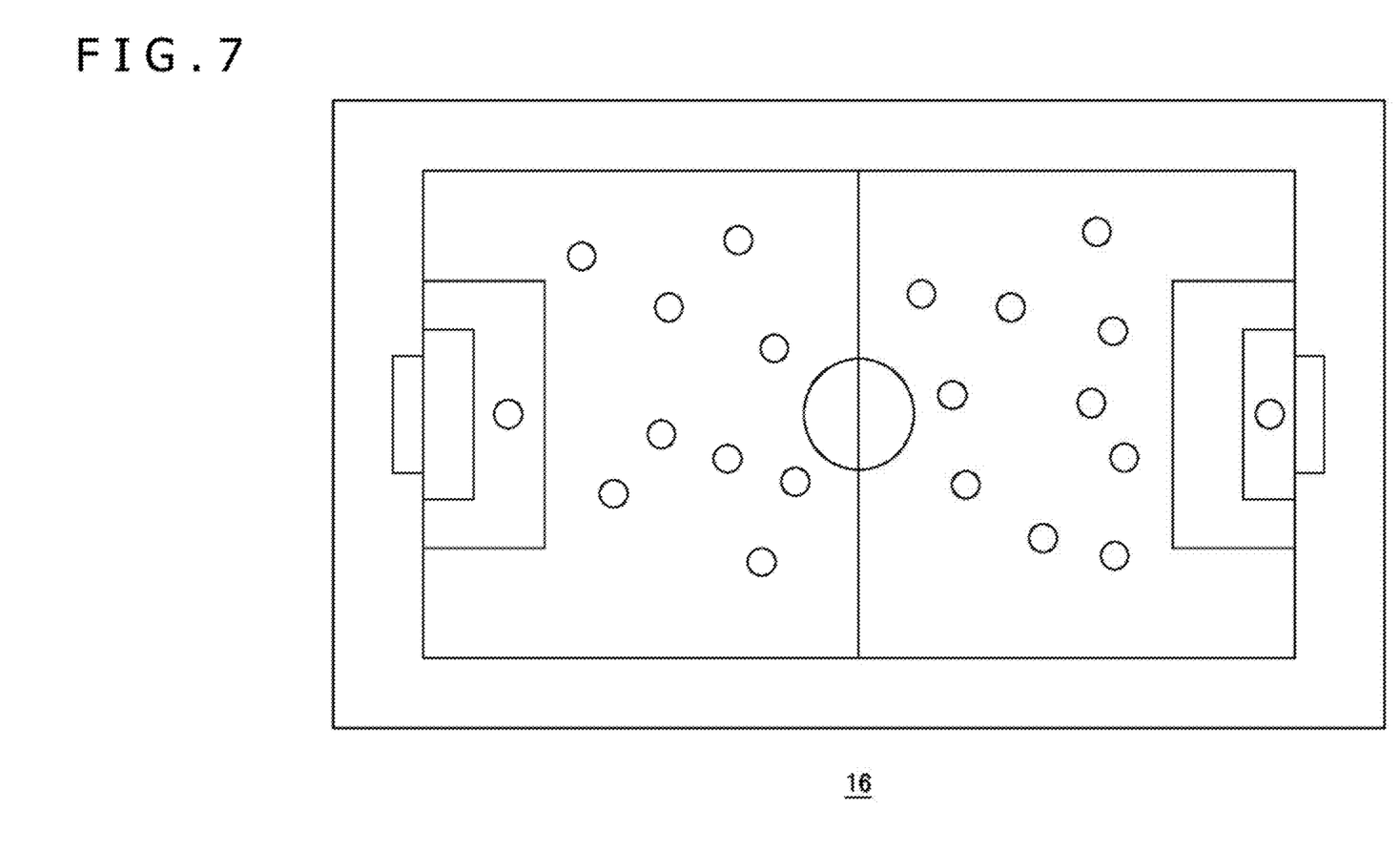
FIG. 7 is a view depicting an example of a game screen distributed to a terminal apparatus.

FIG. 7 depicts an example of a game screen which is distributed to the terminal apparatus 16 of the viewing user. While the user A is playing the game, the second image generating section 124 generates the second image for distribution (distribution image), and the distribution image acquiring section 164 acquires the second image. In addition, the second sound generating section 134 generates the second sound for distribution (distribution sound), and the distribution sound acquiring section 166 acquires the second sound. As a result, the distribution processing section 170 in the embodiment can distribute the game image and sound different from the play image and sound.

On the other hand, when the streaming distribution is started, the image outputted from the output apparatus 4, as indicated in PTL 1, may include a display region of the photographed image of the play user, a comment region in which comments from the viewing user are successively displayed, and the like. The game in the embodiment can freely generate the game image and sound data to be distributed, while the game also has a freedom of switching the game image and sound data to be distributed to the game image and sound data to be outputted to the output apparatus 4. Then, by the start of the streaming distribution, the processing section 100 causes a region in which the image photographed by the camera 7, and the comment transmitted from the viewing user are displayed to be included in the screen displayed by the output apparatus 4.

Figure 8:
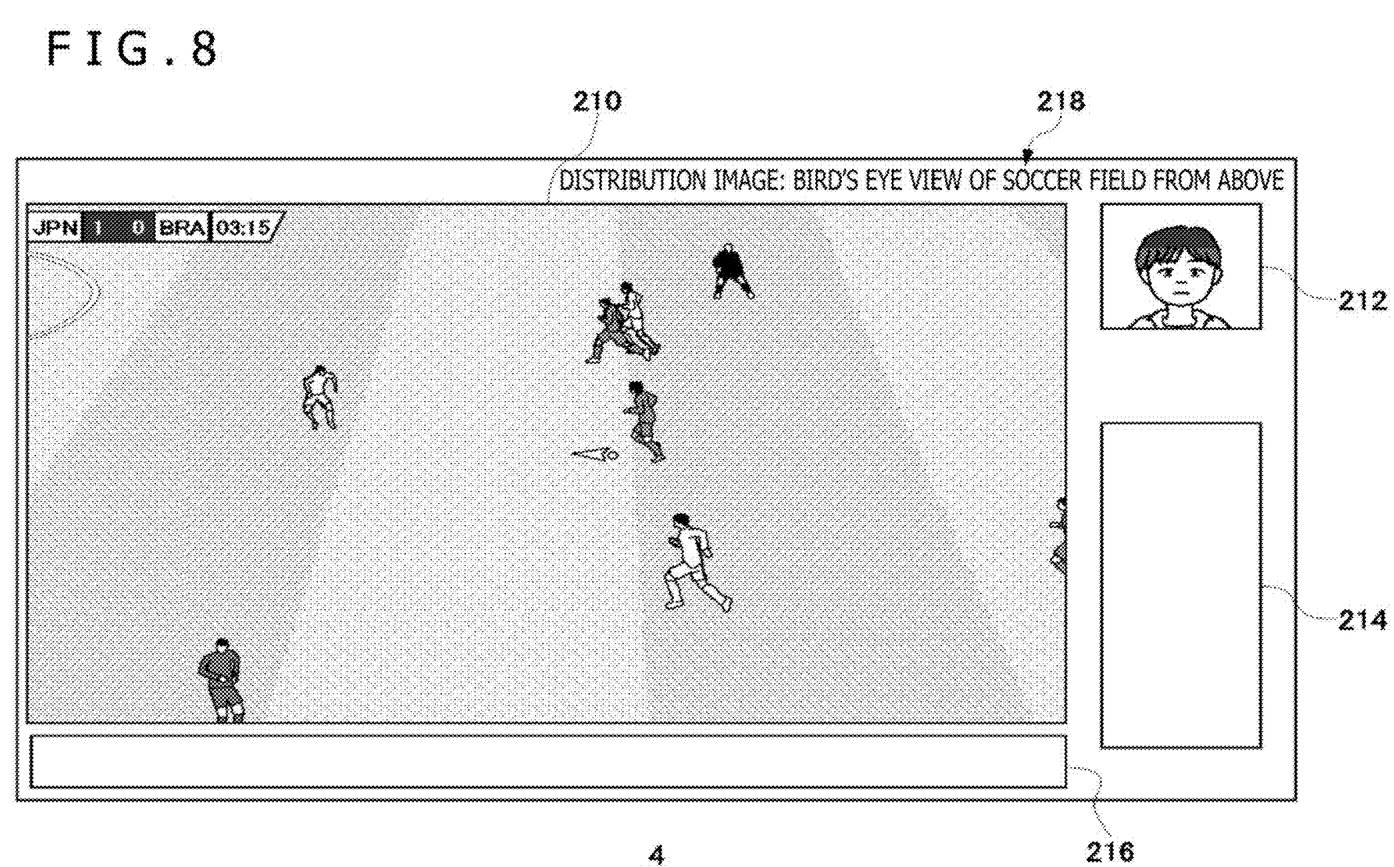
FIG. 8 is a view depicting an example of a screen displayed on the output apparatus.

FIG. 8 depicts an example of a screen displayed on the output apparatus 4. When the streaming distribution is started, the display image generating section 150 generates the display image in accordance with screen layout depicted in FIG. 8. In the example of the screen depicted in FIG. 8, a play image generated in the first image generating section 122 is displayed in a play image display region 210. It should be noted that since as compared with the display region of the play image depicted in FIG. 4, the play image display region 210 is reduced in size, the display image generating section 150 down-sizes the first image data, and displays the image in the play image display region 210. The photographed image photographed by the camera 7 is displayed in a camera image display region 212.

The comment from the viewing user is displayed in a comment display region 214. Incidentally, the viewing user can input the comment from the terminal apparatus 16, and the inputted comment is transmitted to the information processing apparatus 10 via the sharing server 11.

The message which the play user A inputs for the viewing user is displayed in the message display region 216. The message which the play user A inputs is included in a viewing screen provided from the sharing server 11. As a result, the play user and the viewing user can communicate with each other. It should be noted that in the case where the play user A gives a permission, the sound inputted to a microphone of the information processing apparatus 10 may be superposed on the sound for the distribution generated in the second sound generating section 134 to be distributed to the sharing server 11.

The display image generating section 150 generates the display image, and the image providing section 152 displays the display image from the output apparatus 4. As a result, the user A can play the game while seeing the comment from the viewing user. In this case, it is supposed that the contents assisting the play are included in the comment.

For this reason, although the user A can play the game referring to the comment displayed in the comment display region 214, since the viewing user makes a comment on the basis of the game screen different from the play screen, there may be caused the case where it may be impossible for the user A to confirm authenticity of the comment. For example, even when the user A receives an advice that "since a forward of the teammate is free in front of a goal, pass is a better choice," if an image of the front of the goal is not displayed in the play screen, it may be impossible for the user A to confirm authenticity of the advice. For this reason, there may be caused a situation in which the user A desires to confirm what kind of game image the viewing user sees to, give the advice.

Then, the display image generating section 150 preferably causes the information associated with the game image being distributed to be inclined in the display image. The information associated with the distribution image means information indicating which of scenes the distribution image is displayed. Then, the display image generating section 150 receives a description about the display image which is being distributed to the viewing user, and causes the description to be included in the game image. The game may provide a description of "bird's eye view of the soccer field from above" as the description of the distribution image to the display image generating section 150, and the display image generating section 150 may display the description of the distribution image in a distribution image description region 218.

It should be noted that the display image generating section 150 may cause the game image itself being distributed to be included as the information associated with the game image being distributed in a partial region of the display image. The display image generating section 150 acquires the game image being distributed from the game, and down-sizes the game image to cause the resulting game image to be included in the display image. As a result, the user A can confirm the game image which is being distributed. It should be noted that since it is only necessary that the user A can confirm what kind of game image is distributed, the display region of the distribution image may be small in size.

It should be noted that, when the streaming delivery is started, the layout of the image outputted from the output apparatus 4 may be changed to the screen layout depicted in FIG. 8; however, the game image depicted in FIG. 4 may not be held as it is without being changed. Even in this case, the display image generating section 150 preferably causes the information associated with the game image being distributed to be included in the display image, and for example, the game image being distributed may be displayed in a partial region of the display image.

As described above, the game can freely decide the image to be distributed. When the game decides the display image from the output apparatus 4 as the distribution image, supply of the second image and the second sound which are respectively generated by the second image generating section 124 and the second sound generating section 134 to the sharing processing section 160 is stopped. Instead thereof, the image outputted from the image providing section 152 to the output apparatus 4, and the sound outputted from the sound providing section 154 to the output apparatus 4 are both supplied to the sharing processing section 160. The distribution image acquiring section 164 acquires the image provided from the image providing section 152, and the distribution sound acquiring section 166 acquires the sound provided from the sound providing section 154. The encoding section 168 encodes the image and the sound which are provided thereto, and the distribution processing section 170 distributes the encoded image and sound data to the sharing server 11. As a result, the viewing user comes to be able to view the same play image and sound as that in case of the user A. Incidentally, in the case where the user A utilizes the microphone, it is preferred that the microphone sound is superposed on the game sound, so that the resulting sound is provided to the sharing server 11.

The present invention has been desired so far on the basis of the embodiment. It is understood by a person skilled in the art that the embodiment is merely an exemplification, various modified examples can be made in combinations of these constituent elements and processes, and such modified examples also fall within the scope of the present invention. Although in the embodiment, the description is given in such a way that the output apparatus 4 is the television set, for example, the output apparatus 4 may also be a head-mounted display with a sound output function.

The game may have a function which is capable of changing the distribution image in response to a request made from the viewing user. Although the description is given in such a way that the viewing user can input the comment from the terminal apparatus 16, the inputted comment is transmitted to the management server 5 via the sharing server 11, and the management server 5 handles the inputted comment as an instruction to change the distribution image. For example, if there is a predetermined character string, for example, words of "image switching request" in the comment, then, the management server 5 handles this comment as a command to desire the switching of the distribution image. For example, in the case where a comment of "an image switching request from behind the goal posts of the teammate" is inputted, the management server 5 analyzes the language of the comment to specify the distribution image which the viewing user desires. It should be noted that the management server 5 may collect the comments from a plurality of viewing users, and may adopt the most common desire. In such a manner, when the management server 5 specifies that the viewing user desires "the image from the behind of the goal posts of the teammate," the management server 5 notifies the information processing apparatus 10 of the effect. The above processing may also be executed in the sharing processing section 160. When in the sharing processing section 160, the acceptance section 104 accepts the request to switch the distribution image, the image instructing section 172 instructs the game to generate the distribution image. As a result, the second image generating section 124 disposes a virtual camera behind the goal posts of the teammate within the game virtual space to generate the second image.

In addition, in the case where the information processing apparatus 10 has a function of recording the game image, the information processing apparatus 10 may be caused to be able to record a third image different from each of the first image and the second image. In this case, although the game may generate the third image different from each of the first image and the second image, the recording function may generate a third image obtained by synthesizing the first image and the second image to be recorded in the auxiliary storage device 2.

The technology described in the embodiment can be utilized in an application other than the game. An application (live application) for a live of a game in which a plurality of players are being played is taken as an available application for an example. The live application causes the user (distribution user) as the distributor to display the play images of the players on the output apparatus 4. For example, in the game session in which four players participate, the play images of the four players are individually displayed in different display regions in the output apparatus 4 of the distribution user.

The distribution user streaming-distributes the play image of any of the players to the sharing server 11, and distributes the microphone sound as well for the live. In a word, although the play images for four players are displayed on the output apparatus 4 of the distribution user, the game image distributed from the information processing apparatus 10 of the distribution user becomes the play image of any one of the players. The live application makes the declaration at the time of activation, thereby enabling the image to be displayed on the output apparatus 4, and the image to be distributed to differ from each other.

REFERENCE SIGNS LIST

1 . . . Information processing system, 5 . . . Management server, 10 . . . Information processing apparatus, 11 . . . Sharing server, 16a, 16b . . . Terminal apparatus, 100 . . . Processing section, 102 . . . Communication section, 104 . . . Acceptance section, 110 . . . Execution section, 120 . . . Game image generating section, 122 . . . First image generating section, 124 . . . Second image generating section, 130 . . . Game sound generating section, 132 . . . First sound generating section, 134 . . . Second sound generating section, 140 . . . Declaration accepting section, 150 . . . Displaying image generating section, 152 . . . Image providing section, 154 . . . Sound providing section, 160 . . . Sharing processing section, 162 . . . Set image generating section, 164 . . . Delivery image acquiring section, 166 . . . Delivery sound acquiring section, 168 . . . Encoding section, 170 . . . Delivery processing section, 172 . . . Image instructing section

INDUSTRIAL APPLICABILITY

The present invention can be utilized in a technology for distributing an application image.

What is claimed is:

1. An information processing apparatus comprising:
a display image generating section configured to generate a display image including at least
a first image to be viewed by a play user who is playing a game,
a comment transmitted from a viewing user who is viewing a game played by the play user, and
a second image that is an image of the same game as the first image but is different from the first image; and
an image providing section configured to provide the display image to an output apparatus.

2. The information processing apparatus according to claim 1, wherein the display image includes information indicating a scene displayed by the second image.

3. The information processing apparatus according to claim 1, wherein the first image and the second image differ in at least one of a position, a line-of-sight direction, or an angle of view of a virtual camera in a virtual space.

4. The information processing apparatus according to claim 1, wherein the second image is displayed smaller than the first image.

5. A game image displaying method comprising:
generating a display image including at least a first image to be viewed by a play user who is playing a game, a comment transmitted from a viewing user who is viewing a game play by the play user, and a second image that is an image of the same game as the first image but is different from the first image; and
providing the display image to an output apparatus.

6. A non-transitory computer-readable medium having stored thereon a program for a computer for generating a gaming image, the method comprising:
by a display image generating section, generating a display image including at least a first image to be viewed by a play user who is playing a game, a comment transmitted from a viewing user who is viewing a game play by the play user, and a second image that is an image of the same game as the first image but is different from the first image; and
by an image providing section, providing the display image to an output apparatus.

* * * * *